(12) United States Patent
Yokozawa et al.

(10) Patent No.: US 11,607,907 B2
(45) Date of Patent: Mar. 21, 2023

(54) BICYCLE RIM PRINTING APPARATUS AND PRINTING METHOD OF PRINTING NON-CONTACT PRINTED DEPOSIT ON ANNULAR RIM BODY

(71) Applicant: SHIMANO INC., Sakai (JP)

(72) Inventors: Dai Yokozawa, Sakai (JP); Wataru Yamauchi, Sakai (JP)

(73) Assignee: SHIMANO INC., Sakai (JP)

( * ) Notice: Subject to any disclaimer, the term of this patent is extended or adjusted under 35 U.S.C. 154(b) by 302 days.

(21) Appl. No.: 16/894,896

(22) Filed: Jun. 8, 2020

(65) Prior Publication Data

US 2020/0298618 A1    Sep. 24, 2020

Related U.S. Application Data

(62) Division of application No. 15/457,939, filed on Mar. 13, 2017, now Pat. No. 10,717,321.

(51) Int. Cl.
| | | |
|---|---|---|
| *B41J 3/407* | (2006.01) | |
| *B60B 21/02* | (2006.01) | |
| *B41M 5/00* | (2006.01) | |
| *B05B 12/30* | (2018.01) | |
| *B60B 21/06* | (2006.01) | |
| *B60B 1/00* | (2006.01) | |

(52) U.S. Cl.
CPC ............ *B60B 21/025* (2013.01); *B05B 12/30* (2018.02); *B41J 3/40731* (2020.08); *B41M 5/0088* (2013.01); *B60B 21/062* (2013.01); *B60B 1/003* (2013.01); *B60B 2310/616* (2013.01); *B60B 2310/656* (2013.01)

(58) Field of Classification Search
CPC ...... B41J 3/407; B41J 3/4073; B41M 5/0088; B60B 2310/656
See application file for complete search history.

(56) References Cited

U.S. PATENT DOCUMENTS

| | | | |
|---|---|---|---|
| 7,114,785 B2 | 10/2006 | Ording et al. | |
| 8,865,256 B2 | 10/2014 | Ogawa | |
| 2001/0017085 A1 | 8/2001 | Kubo et al. | |
| 2008/0284238 A1 | 11/2008 | Nishimura et al. | |
| 2011/0115280 A1 | 5/2011 | Mercat et al. | |
| 2012/0049610 A1 | 3/2012 | Lew | |
| 2014/0265538 A1* | 9/2014 | Brady ................. | B41M 5/0082 |
| | | | 301/95.101 |

(Continued)

FOREIGN PATENT DOCUMENTS

| | | |
|---|---|---|
| CN | 104070924 | 10/2014 |
| CN | 104816538 | 8/2015 |

(Continued)

OTHER PUBLICATIONS

Office Action issued by the U.S. Patent and Trademark Office for the U.S. Appl. No. 15/457,939, dated May 20, 2019.

(Continued)

*Primary Examiner* — Scott A Richmond
(74) *Attorney, Agent, or Firm* — Mori & Ward, LLP

(57) ABSTRACT

A bicycle rim printing apparatus comprises a non-contact printer to print a non-contact printed deposit to an annular rim body, a rim holder to hold the annular rim body, and a rotational actuator to rotate the rim holder relative to the non-contact printer about a rotational axis.

20 Claims, 11 Drawing Sheets

(56) References Cited

U.S. PATENT DOCUMENTS

2015/0321486 A1* 11/2015 Palumbo .............. B41J 3/40733
347/37

FOREIGN PATENT DOCUMENTS

| DE | 102012006371 | 7/2012 |
|----|--------------|--------|
| DE | 102014002764 | 9/2014 |
| EP | 3156253 | 4/2017 |
| TW | 201441066 | 11/2014 |
| TW | 201600361 | 1/2016 |

OTHER PUBLICATIONS

Office Action with Form PTO-892 Notice of References Cited issued by the U.S. Patent and Trademark Office for the U.S. Appl. No. 15/457,939, dated Aug. 13, 2019.
Office Action issued by the U.S. Patent and Trademark Office for the U.S. Appl. No. 15/457,939, dated Jan. 21, 2020.

* cited by examiner

BICYCLE RIM PRINTING APPARATUS AND PRINTING METHOD OF PRINTING NON-CONTACT PRINTED DEPOSIT ON ANNULAR RIM BODY

CROSS-REFERENCE TO RELATED APPLICATIONS

The present application is a divisional application of the U.S. patent application Ser. No. 15/457,939 filed Mar. 13, 2017. The contents of this application are incorporated herein by reference in their entirety.

BACKGROUND OF THE INVENTION

Field of the Invention

The present invention relates to a bicycle rim printing apparatus and a printing method of printing a non-contact printed deposit on an annular rim body.

Discussion of the Background

Bicycling is becoming an increasingly more popular faint of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a rim.

SUMMARY OF THE INVENTION

In accordance with a first aspect of the present invention, a bicycle rim printing apparatus comprises a non-contact printer to print a non-contact printed deposit to an annular rim body, a rim holder to hold the annular rim body, and a rotational actuator to rotate the rim holder relative to the non-contact printer about a rotational axis.

With the bicycle rim printing apparatus according to the first aspect, it is possible to improve design of the annular rim body even when the annular rim body includes a curved surface having a large curvature because it is possible to print the first non-contact printed deposit on the bicycle rim by rotating the annular rim body.

In accordance with a second aspect of the present invention, the bicycle rim printing apparatus according to the first aspect further comprises a base structure. The non-contact printer is attached to the base structure to print the non-contact printed deposit to the annular rim body.

With the bicycle rim printing apparatus according to the second aspect, it is possible to stabilize an orientation of the non-contact printer relative to the annular rim body.

In accordance with a third aspect of the present invention, the bicycle rim printing apparatus according to the second aspect further comprises a pivot structure pivotally coupling one of the rotational actuator and the non-contact printer to the base structure about a pivot axis non-parallel to the rotational axis.

With the bicycle rim printing apparatus according to the third aspect, the pivot structure allows the annular rim body and the non-contact printer to be inclined relative to each other. This allows a non-contact printed deposit to be easily printed on a curved surface of the annular rim body.

In accordance with a fourth aspect of the present invention, a printing method of printing a non-contact printed deposit on an annular rim body comprises rotating the annular rim body relative to a non-contact printer about a rotational axis with a rotational actuator, and printing the non-contact printed deposit to the annular rim body with the non-contact printer during a rotational movement of the annular rim body.

With the printing method according to the fourth aspect, it is possible to improve design of the annular rim body even when the annular body includes a curved surface having a large curvature because it is possible to print the first non-contact printed deposit on the bicycle rim by inclining either the bicycle rim or a printer head.

In accordance with a fifth aspect of the present invention, the printing method according to the fourth aspect further comprises inclining one of the annular rim body and the non-contact printer relative to the other of the annular rim body and the non-contact printer. The printing of the non-contact printing deposit includes printing the non-contact printed deposit to the annular rim body with the non-contact printer in a state where the annular rim body and the non-contact printer are inclined relative to each other.

With the printing method according to the fifth aspect, it is possible to improve design of the annular rim body even when the annular rim body includes a curved surface having a large curvature because it is possible to print the first non-contact printed deposit on the bicycle rim by inclining either the bicycle rim or a printer head.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
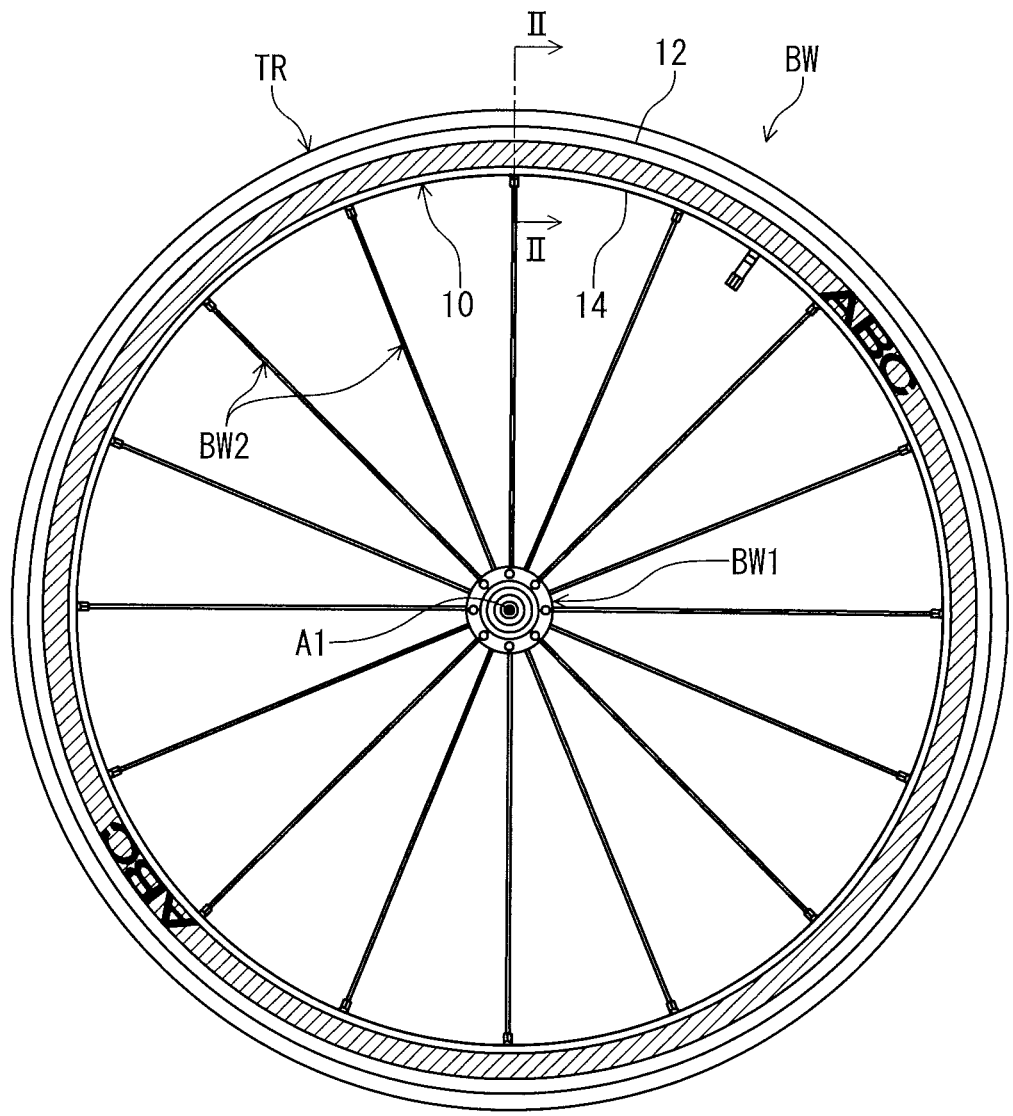
FIG. 1 is a side elevational view of a bicycle wheel including a bicycle rim in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle wheel assembly BW includes a bicycle rim 10 in accordance with a first embodiment. The bicycle wheel assembly BW further includes a bicycle hub assembly BW1 and spokes BW2. The bicycle rim 10 is coupled to the bicycle hub assembly BW1 via the spokes BW2. A tire TR is attached to the bicycle rim 10. The bicycle rim 10 has a rotational center axis A1.

Figure 2:
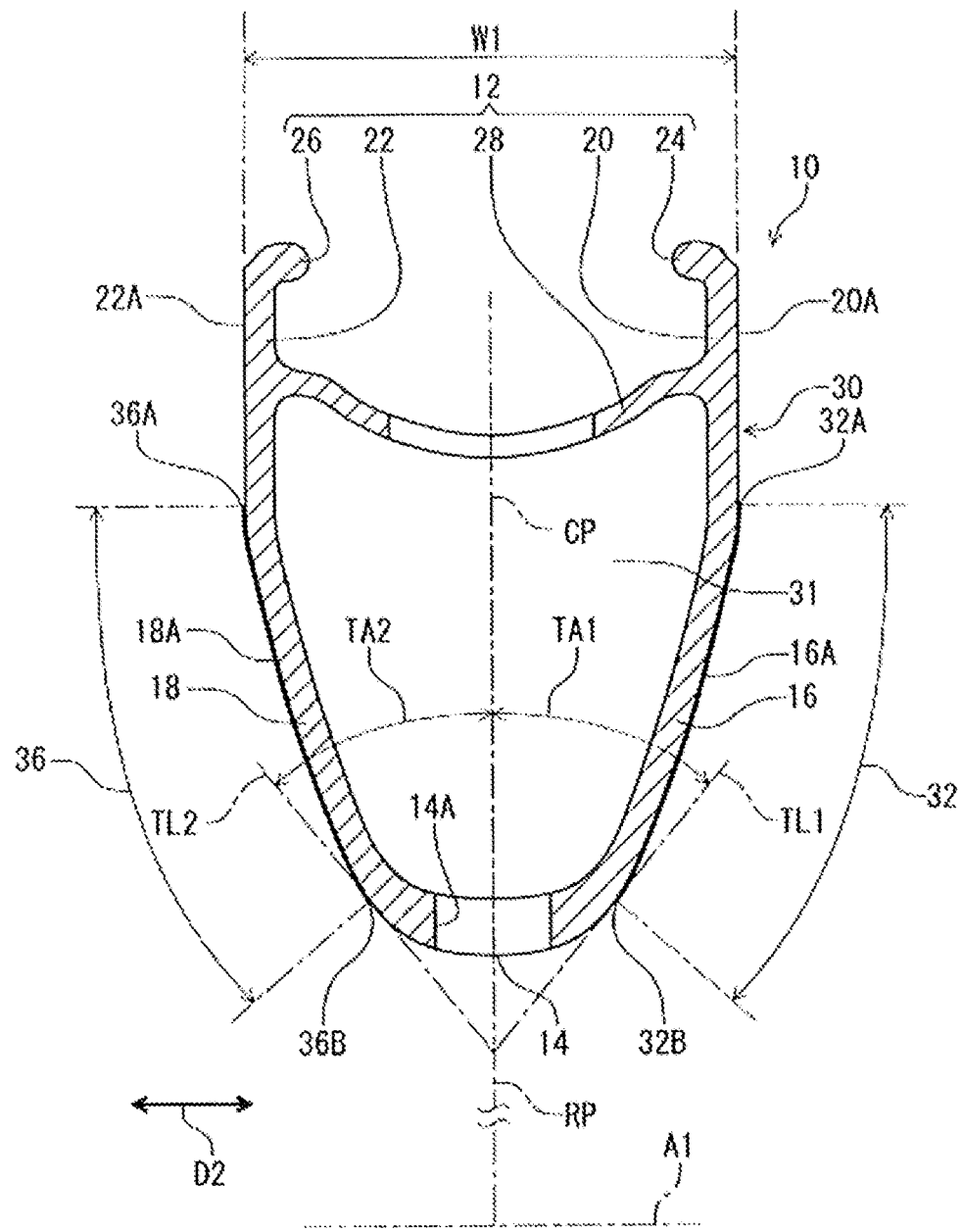
FIG. 2 is a cross-sectional view of the bicycle rim taken along line II-II of FIG. 1.

As seen in FIG. 2, the bicycle rim 10 comprises a tire-attachment portion 12, an inner peripheral portion 14, a first side portion 16, and a second side portion 18. The tire-attachment portion 12 has an annular shape. The tire TR (FIG. 1) is attached to the tire-attachment portion 12. In this embodiment, the tire-attachment portion 12 includes a first brake contact part 20, a second brake contact part 22, a first bead flange 24, a second bead flange 26, and an outer ridge 28. The first brake contact part 20 includes a first brake contact surface 20A having an annular shape defined about the rotational center axis A1. The second brake contact part 22 includes a second brake contact surface 22A having an annular shape defined about the rotational center axis A1. Preferably, each of the first brake contact surface 20A and the second brake contact surface 22A is a flat surface. The first bead flange 24 is provided at a radially outer end of the first brake contact part 20. The second bead flange 26 is provided at a radially outer end of the second brake contact part 22. The outer ridge 28 is coupled to the first brake contact part 20 and the second brake contact part 22.

The inner peripheral portion 14 is provided radially inwardly from the tire-attachment portion 12 with respect to the rotational center axis A1 of the bicycle rim 10. As seen in FIG. 1, the inner peripheral portion 14 has an annular shape. The inner peripheral portion 14 is coupled to the spokes BW2. As seen in FIG. 2, the inner peripheral portion 14 includes a spoke attachment opening 14A. In this embodiment, the inner peripheral portion 14 includes spoke attachment openings 14A through which the spokes BW2 extend respectively.

As seen in FIG. 2, the first side portion 16 extends radially inwardly from the tire-attachment portion 12 to the inner peripheral portion 14. The second side portion 18 extends radially inwardly from the tire-attachment portion 12 to the inner peripheral portion 14. The second side portion 18 is at least partly provided on a reverse side of the first side portion 16 in an axial direction D1 with respect to the rotational center axis A1. The tire-attachment portion 12, the inner peripheral portion 14, the first side portion 16, and the second side portion 18 constitute the annular rim body 30. The annular rim body 30 is made of a metallic material, a non-metallic material, or combination thereof.

In this embodiment, the bicycle rim 10 is a clincher rim. However, the bicycle rim 10 can be other type of rim such as a tubular rim. Furthermore, the bicycle rim 10 is a hollow rim. The tire-attachment portion 12, the inner peripheral portion 14, the first side portion 16, and the second side portion 18 define an annular interior space 31. However, the bicycle rim 10 can be a solid rim.

As seen in FIG. 2, the bicycle rim 10 comprises a first non-contact printed deposit 32 at least partly provided on the first side portion 16. The first side portion 16 includes a first curved surface 16A. The first non-contact printed deposit 32 is at least partly provided on the first curved surface 16A. For example, the first non-contact printed deposit 32 includes at least one pigment. In this embodiment, the first curved surface 16A has a convex shape and extends from the first brake contact surface 20A to the inner peripheral portion 14. However, the first curved surface 16A can have other shapes such as a concave shape. The first curved surface 16A is inclined relative to the first brake contact surface 20A. The first side portion 16 can include another surface having other shapes such as a flat shape.

Figure 3:
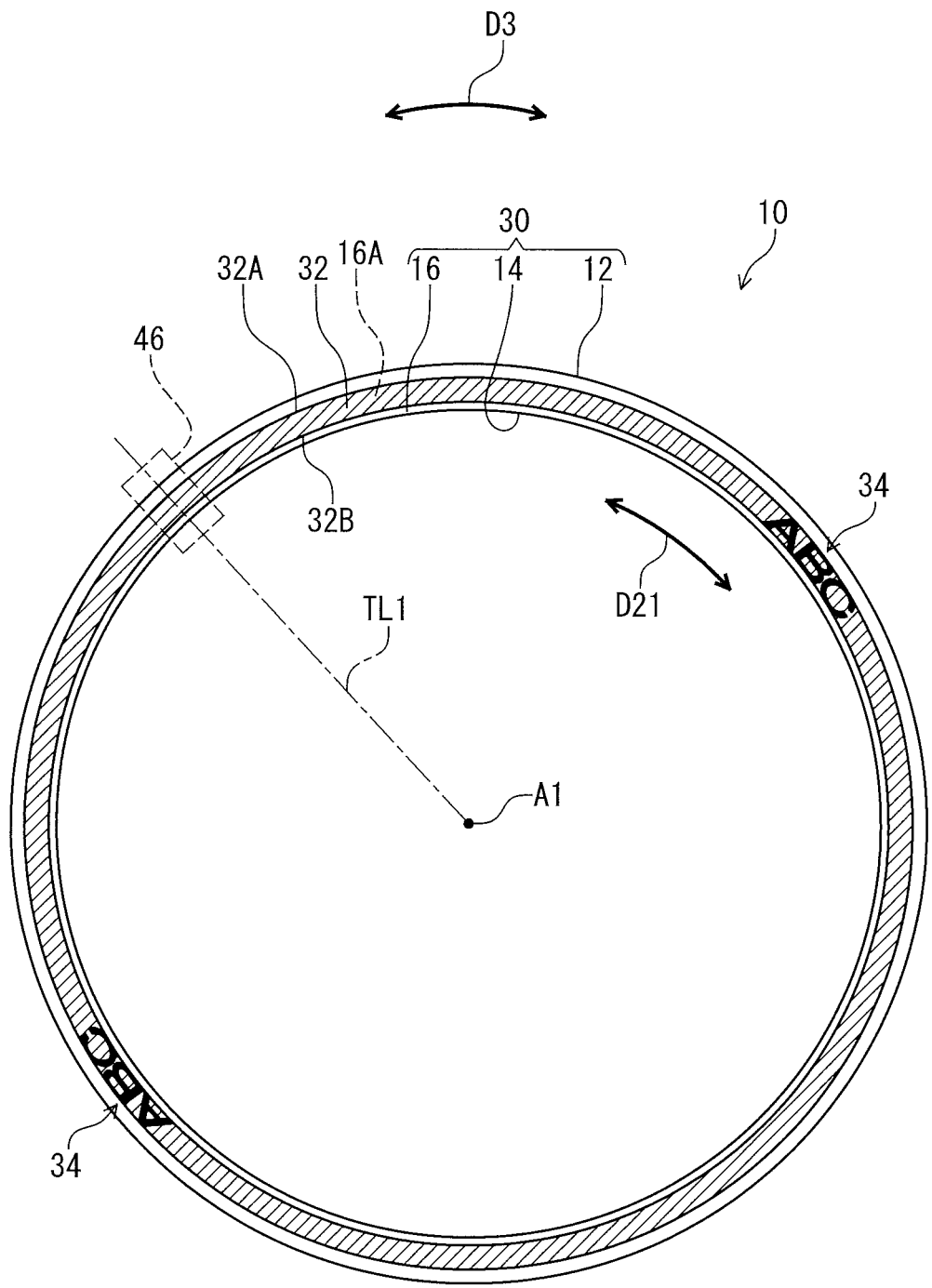
FIG. 3 is a side elevational view of the bicycle rim illustrated in FIG. 1.

In this embodiment, as seen in FIG. 3, each of the first side portion 16, the first curved surface 16A, and the first non-contact printed deposit 32 has an annular shape defined about the rotational center axis A1. As seen in FIGS. 2 and 3, the first non-contact printed deposit 32 includes a first outer periphery 32A and a first inner periphery 32B.

As seen in FIG. 2, the first non-contact printed deposit 32 extends to the inner peripheral portion 14. The first non-contact printed deposit 32 extends to an axial center plane CP defined to bisect an axial maximum width W1 of the bicycle rim 10 in the axial direction D1. The first non-contact printed deposit 32 extends from the first brake contact surface 20A to the inner peripheral portion 14 (the axial center plane CP). The first non-contact printed deposit 32 does not reach the axial center plane CP in this embodiment. However, the first non-contact printed deposit 32 can reach the axial center plane CP.

A first tangential line TL1 is defined on the first curved surface 16A in which the first non-contact printed deposit 32 is provided. A first surface angle TA1 is defined by the first tangential line TL1 and a reference plane RP perpendicular to the rotational center axis A1. In this embodiment, the reference plane RP coincides with the axial center plane CP. However, the reference plane RP can be offset parallel from the axial center plane CP. The first tangential line TL1 is defined on the first inner periphery 32B. The first surface angle TA1 is larger than 30 degrees. The first surface angle TA1 is equal to or larger than 35 degrees. However, the first surface angle TA1 is not limited to this embodiment.

As seen in FIG. 3, the first tangential line TL1 extends radially outwardly from the rotational center axis A1 when viewed in the axial direction D1. In other words, the first tangential line TL1 extends in a radial direction with respect to the rotational center axis A1. In this embodiment, the first tangential line TL1 can be defined at any positions on the first curved surface 16A since the first non-contact printed deposit 32 has an annular shape.

Figure 5:
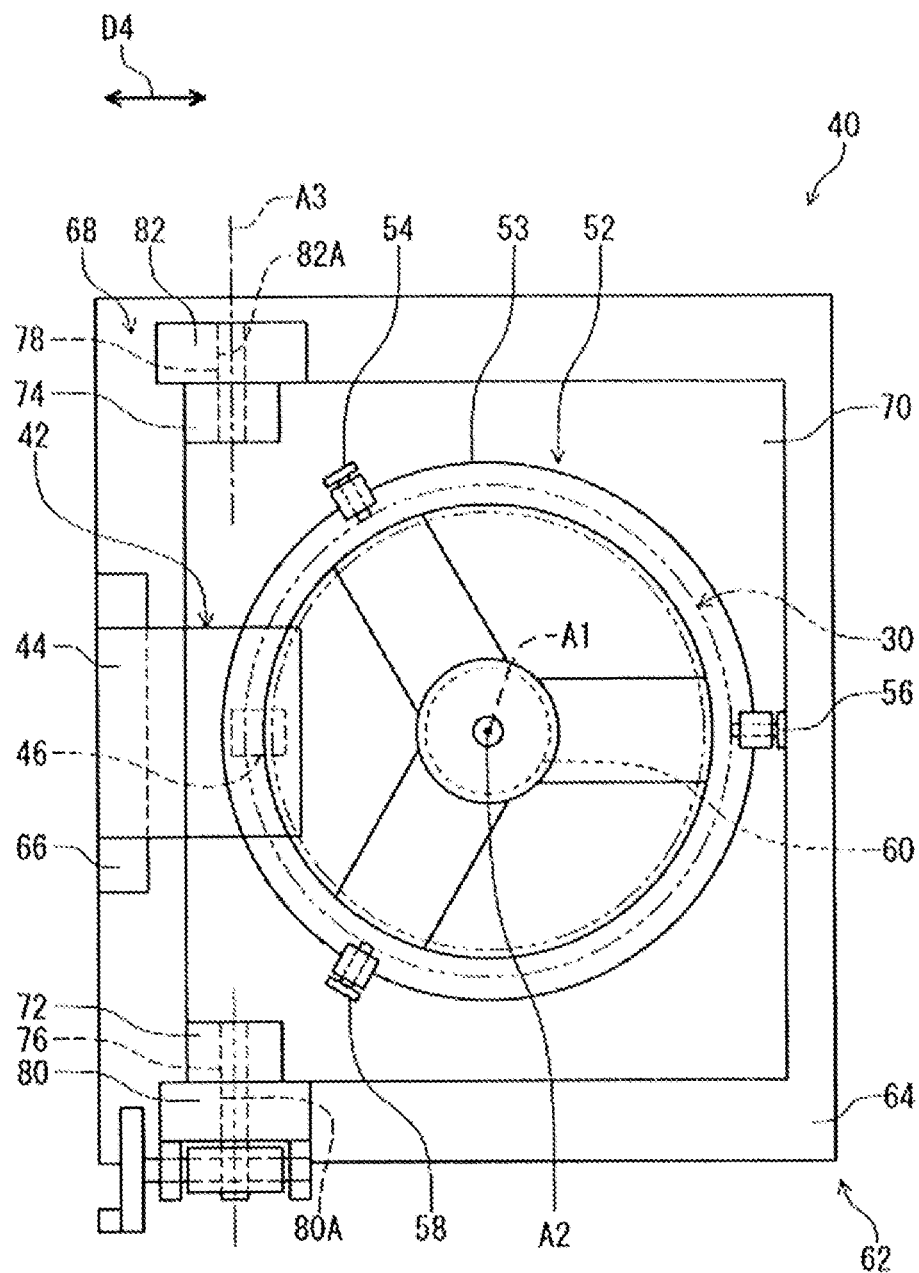
FIG. 5 is a plan view of a bicycle rim printing apparatus in accordance with the first embodiment.

A printing direction D21 of the first non-contact printed deposit 32 on the first side portion 16 extends in a circumferential direction D3 with respect to the rotational center axis A1. In this embodiment, the first non-contact printed deposit 32 is printed on the first side portion 16 with a non-contact printer 42 (FIG. 5, described later) having a printer head 46 (FIG. 5, described later). The printing direction D21 of the first non-contact printed deposit 32 can be identified by using a tool such as a microscope. For example, fine lines are formed along the printing direction D21 on the first non-contact printed deposit 32.

In this embodiment, the first non-contact printed deposit 32 has a pixel count equal to or larger than 200 dpi. The pixel count is equal to or smaller than 2000 dpi. However, the pixel count of the first non-contact printed deposit 32 is not limited to this embodiment.

The first non-contact printed deposit 32 forms at least one logo 34. In this embodiment, the first non-contact printed deposit 32 forms two logos 34 "ABC." However, the at least one logo 34 can be omitted from the bicycle rim 10. The logo 34 is provided on the first curved surface 16A. The logo 34 may extend from the first outer periphery 32A to the first inner periphery 32B.

As seen in FIG. 2, the bicycle rim 10 further comprises a second non-contact printed deposit 36 provided on the second side portion 18. The second side portion 18 includes a second curved surface 18A. The second non-contact printed deposit 36 is at least partly provided on the second curved surface 18A. For example, the second non-contact printed deposit 36 includes at least one pigment. In this embodiment, the second curved surface 18A has a convex shape and extends from the second brake contact surface 22A to the inner peripheral portion 14. However, the second curved surface 18A can have other shapes such as a concave shape. The second curved surface 18A is inclined relative to the second brake contact surface 22A. The second side portion 18 can include another surface having other shapes such as a flat shape.

Figure 4:
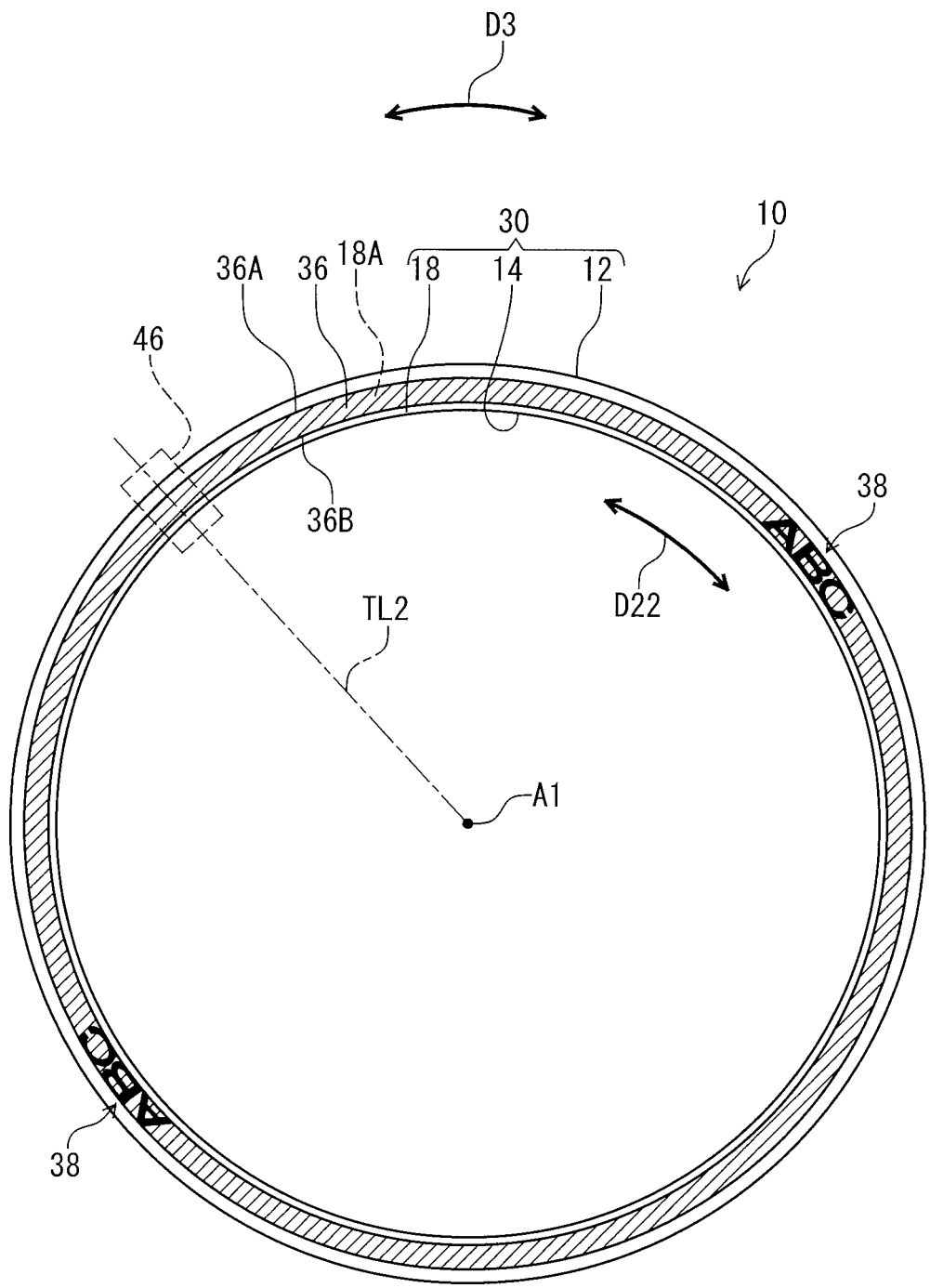
FIG. 4 is another side elevational view of the bicycle rim illustrated in FIG. 1.

In this embodiment, as seen in FIG. 4, each of the second side portion 18, the second curved surface 18A, and the second non-contact printed deposit 36 has an annular shape defined about the rotational center axis A1. As seen in FIGS. 2 and 4, the second non-contact printed deposit 36 includes a second outer periphery 36A and a second inner periphery 36B.

As seen in FIG. 2, the second non-contact printed deposit 36 extends to the inner peripheral portion 14. The second non-contact printed deposit 36 extends to the axial center plane CP. The second non-contact printed deposit 36 extends from the second brake contact surface 22A to the inner peripheral portion 14 (the axial center plane CP). In this embodiment, the second non-contact printed deposit 36 is spaced apart from the first non-contact printed deposit 32. The second non-contact printed deposit 36 does not reach the axial center plane CP. However, the second non-contact printed deposit 36 can be in contact with the first non-contact printed deposit 32 on the axial center plane CP. The second non-contact printed deposit 36 can reach the axial center plane CP. The annular rim body 30 is symmetrical with respect to the axial center plane CP. However, the annular rim body 30 can be asymmetrical with respect to the axial center plane CP.

A second tangential line TL2 is defined on the second curved surface 18A in which the second non-contact printed deposit 36 is provided. A second surface angle TA2 is defined by the second tangential line TL2 and the reference plane RP. In this embodiment, the second tangential line TL2 is defined on the second inner periphery 36B. The second surface angle TA2 is larger than 30 degrees. The second surface angle TA2 is equal to or larger than 35 degrees. However, the second surface angle TA2 is not limited to this embodiment.

As seen in FIG. 4, the second tangential line TL2 extends radially outwardly from the rotational center axis A1 when viewed in the axial direction D1. In this embodiment, the second tangential line TL2 can be defined at any positions on the second curved surface 18A since the second non-contact printed deposit 36 has an annular shape.

A printing direction D22 of the second non-contact printed deposit 36 on the second side portion 18 extends in the circumferential direction D3 with respect to the rotational center axis A1. In this embodiment, the second non-contact printed deposit 36 is printed on the second side portion 18 with the non-contact printer 42 (FIG. 5, described later) such as an inkjet printer having the printer head 46 (FIG. 5, described later). The printing direction D22 of the second non-contact printed deposit 36 can be identified by using a tool such as a microscope. For example, fine lines are formed along the printing direction D22 on the second non-contact printed deposit 36.

In this embodiment, the second non-contact printed deposit 36 has a pixel count equal to or larger than 200 dpi. The pixel count is equal to or smaller than 2000 dpi. However, the pixel count of the second non-contact printed deposit 36 is not limited to this embodiment.

The second non-contact printed deposit 36 forms at least one logo 38. In this embodiment, the second non-contact printed deposit 36 forms two logos 38 "ABC." However, the at least one logo 38 can be omitted from the bicycle rim 10. The logo 38 is provided on the second curved surface 18A. The logo 38 may extend from the second outer periphery 36A to the second inner periphery 36B.

As seen in FIG. 5, a bicycle rim printing apparatus 40 in accordance with the first embodiment is illustrated. The bicycle rim printing apparatus 40 comprises the non-contact printer 42 to print a non-contact printed deposit to the annular rim body 30. The non-contact printer 42 is configured to print the first non-contact printed deposit 32 (FIG. 2) to the first side portion 16 of the annular rim body 30. The non-contact printer 42 is configured to print the second non-contact printed deposit 36 (FIG. 2) to the second side portion 18 of the annular rim body 30. In the bicycle rim printing apparatus 40, one of the first non-contact printed deposit 32 and the second non-contact printed deposit 36 is printed on one of the first side portion 16 and the second side portion 18, and then the other of the first non-contact printed deposit 32 and the second non-contact printed deposit 36 is printed on the other of the first side portion 16 and the second side portion 18.

In this embodiment, the non-contact printer 42 includes an inkjet printer. Specifically, the non-contact printer 42 includes a printer housing 44 and the printer head 46. The printer head 46 is provided in the printer housing 44. Examples of the printer head 46 include an inkjet head. For example, the printer head 46 includes nozzles, ink cartridges, and an ink supplier. The nozzles are arranged to deposit ink on a surface of a target object such as the annular rim body 30. The ink cartridges are connected to the nozzles and stores ink. The ink supplier supplies ink from the ink cartridges to the nozzles. Since the inkjet printer has been known in the printer field, it will not be described in detail here for the sake of brevity.

As seen in FIG. 5, the bicycle rim printing apparatus 40 comprises a rim holder 52 to hold the annular rim body 30. The rim holder 52 has a holder body 53, a first holder 54, a second holder 56, and a third holder 58. The first holder 54 is threadedly engaged with the holder body 53. The second holder 56 is threadedly engaged with the holder body 53. The third holder 58 is threadedly engaged with the holder body 53. Tightening of at least one of the first to third holders 54 to 58 fixedly couples the annular rim body 30 to the holder body 53. Thus, the annular rim body 30 is detachably held by the rim holder 52. The structure of the rim holder 52 is not limited to this embodiment.

The term "detachably held" or "detachably holding," as used herein, encompasses configurations in which an element directly secured to another element by directly affixing the element to the other element while the element is detachable from the other element without substantial damage; and configurations in which the element is indirectly secured to the other element via intermediate member(s) while the element is detachable from the other element and the intermediate member(s) without substantial damage. This concept also applies to words of similar meaning, for example, "detachably attached," "detachably joined," "detachably connected," "detachably coupled," "detachably mounted," "detachably bonded," "detachably fixed" and their derivatives.

Figure 6:
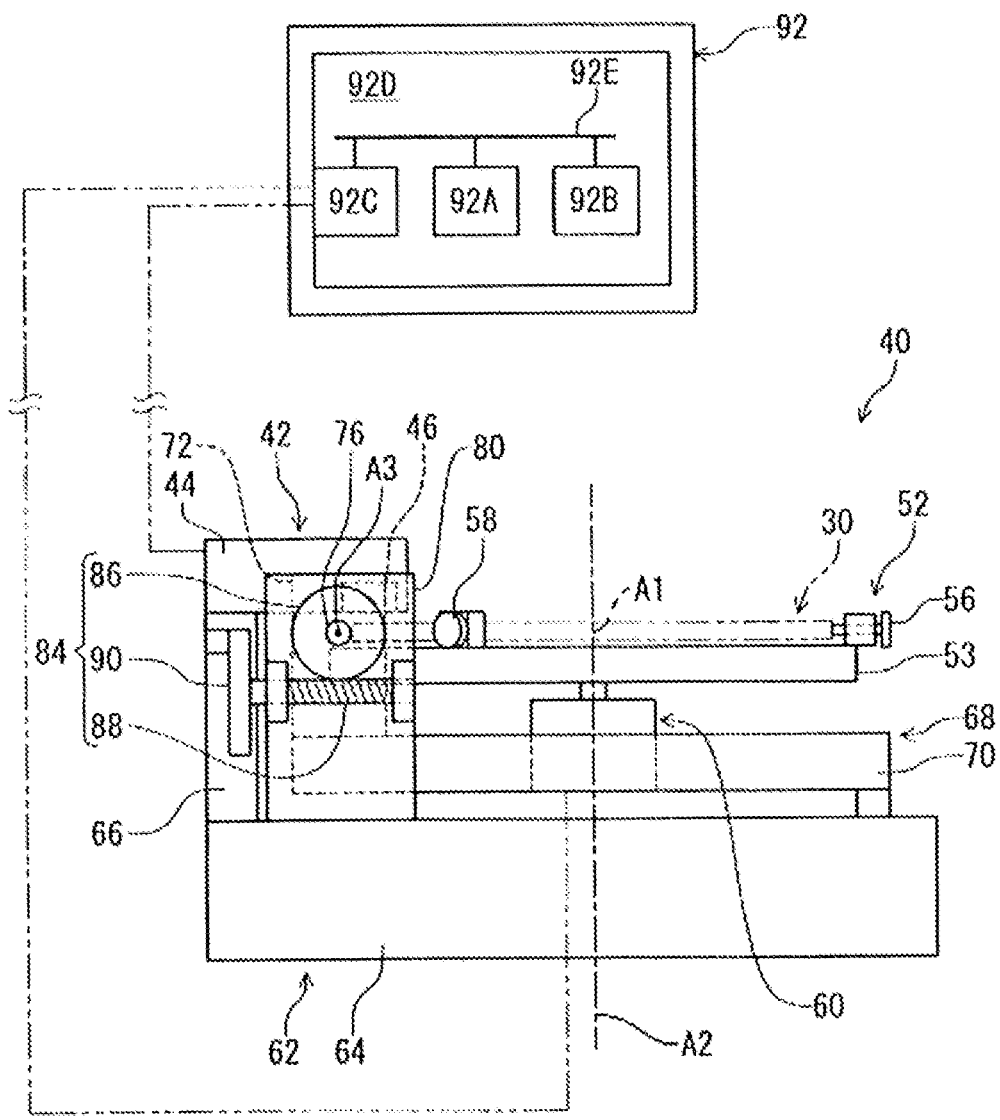
FIG. 6 is a side elevational view of the bicycle rim printing apparatus illustrated in FIG. 5.

As seen in FIG. 6, the bicycle rim printing apparatus 40 comprises a rotational actuator 60 to rotate the rim holder 52 relative to the non-contact printer 42 about a rotational axis A2. Examples of the rotational actuator 60 include a stepper motor, an alternating current (AC) motor, and a direct current (DC) motor. In this embodiment, the rotational actuator 60 includes the stepper motor. An output shaft of the rotational actuator 60 is coupled to the rim holder 52 (e.g., the holder body 53). A bearing (not shown) can be provided between the rotational actuator 60 and the rim holder 52 to rotatably support the rim holder 52 about the rotational axis A2.

The bicycle rim printing apparatus 40 further comprises a base structure 62. The non-contact printer 42 is attached to the base structure 62 to print the non-contact printed deposit to the annular rim body 30. The printer housing 44 of the non-contact printer 42 is secured to the base structure 62. In this embodiment, the base structure 62 includes a base 64 and a printer support 66. The printer support 66 extends upwardly from the base 64. The printer housing 44 of the non-contact printer 42 is secured to an upper end of the printer support 66.

As seen in FIG. 5, the bicycle rim printing apparatus 40 further comprises a pivot structure 68 pivotally coupling one of the rotational actuator 60 and the non-contact printer 42 to the base structure 62 about a pivot axis A3 non-parallel to the rotational axis A2. In this embodiment, the pivot structure 68 pivotally couples the rotational actuator 60 to the base structure 62 about the pivot axis A3. However, the pivot structure 68 can pivotally couple the non-contact printer 42 to the base structure 62 about the pivot axis A3.

Figure 7:
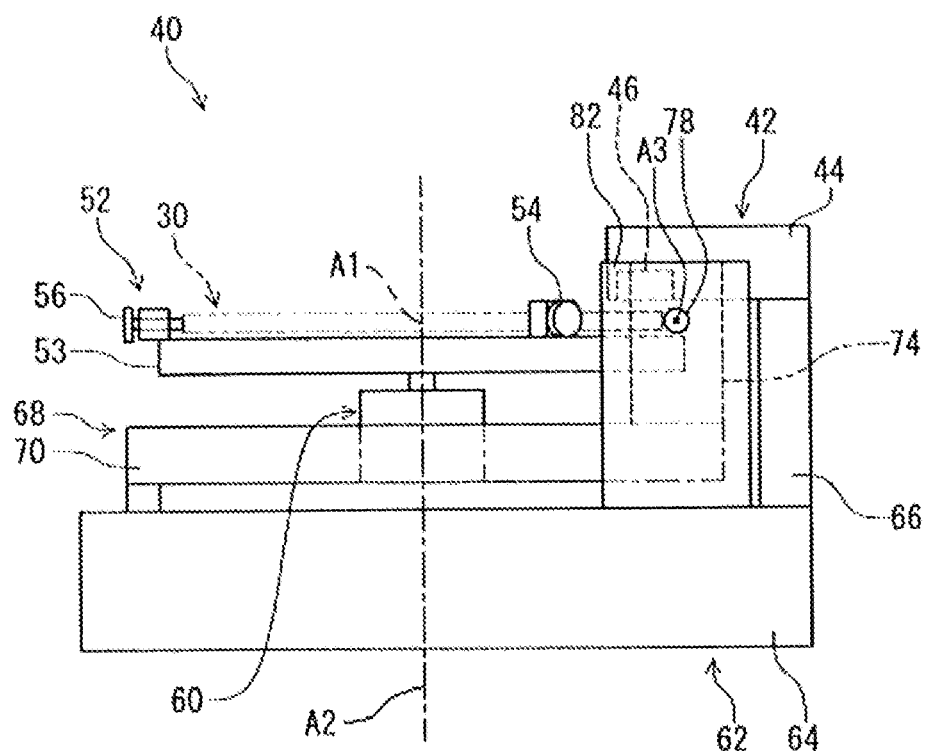
FIG. 7 is another side elevational view of the bicycle rim printing apparatus illustrated in FIG. 5.

As seen in FIGS. 5 to 7, the pivot structure 68 includes a pivot base 70, a first pivot arm 72, a second pivot arm 74, a first pivot shaft 76, and a second pivot shaft 78. The rotational actuator 60 is mounted on the pivot base 70. The first pivot arm 72 extends from the pivot base 70. The second pivot arm 74 extends from the pivot base 70 and is spaced apart from the first pivot arm 72 along the pivot axis A3.

The base structure 62 further includes a first pivot support 80 and a second pivot support 82. The first pivot support 80 extends from the base 64. The second pivot support 82 extends from the base 64 and is spaced apart from the first pivot support 80 along the pivot axis A3. The first pivot arm 72 is pivotally coupled to the first pivot support 80 with the first pivot shaft 76. The second pivot arm 74 is pivotally coupled to the second pivot support 82 with the second pivot shaft 78.

In this embodiment, as seen in FIG. 5, the first pivot shaft 76 is secured to the first pivot arm 72. The second pivot shaft 78 is secured to the second pivot arm 74. The first pivot support 80 includes a first through-hole 80A. The second pivot support 82 includes a second through-hole 82A. The first pivot shaft 76 is slidably provided in the first through-hole 80A. The second pivot shaft 78 is slidably provided in the second through-hole 82A.

As seen in FIG. 6, the bicycle rim printing apparatus 40 further comprises a position adjustment structure 84. The position adjustment structure 84 is configured to change a position of the one of the rotational actuator 60 and the non-contact printer 42 relative to the base structure 62. In this embodiment, the position adjustment structure 84 is configured to change a position of the rotational actuator 60 relative to the base structure 62.

The position adjustment structure 84 includes a worm drive structure. In this embodiment, the position adjustment structure 84 includes a worm wheel 86, a worm 88, and a handle 90. The worm wheel 86 is secured to the first pivot shaft 76 to rotate along with the first pivot shaft 76 and the pivot base 70 relative to the base structure 62. The worm 88 is rotatably supported by the base structure 62. The worm 88 is engaged with the worm wheel 86. The worm 88 is rotatably supported by the base structure 62 (e.g., the first pivot support 80). The handle 90 is secured to the worm 88 to rotate together.

Figure 8:
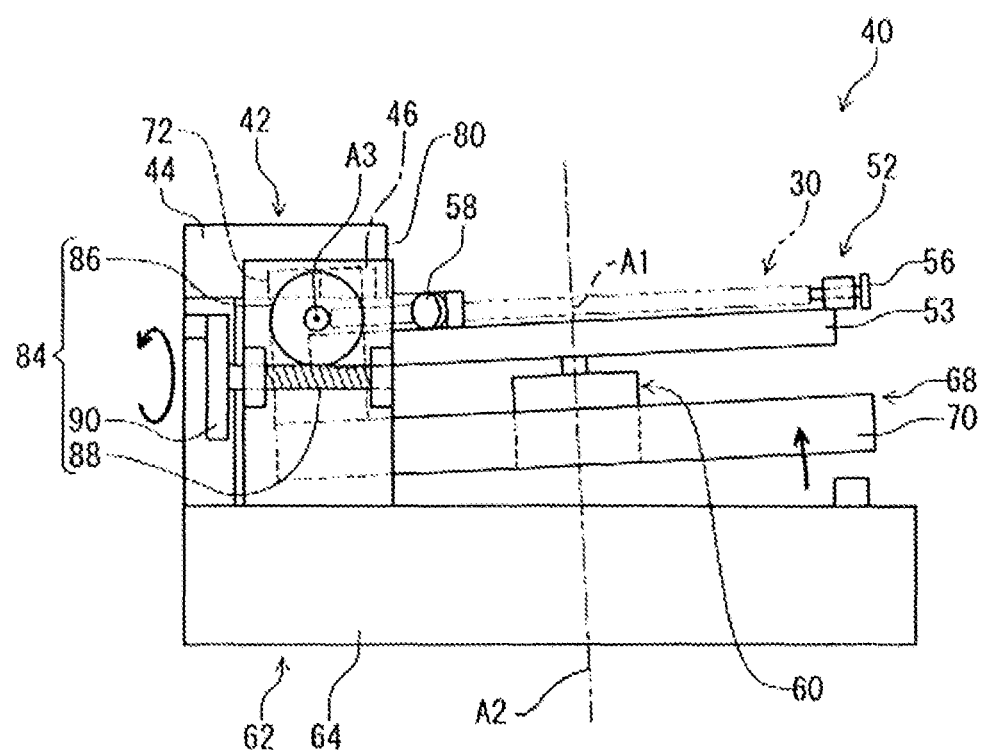
FIG. 8 is a side elevational view of the bicycle rim printing apparatus illustrated in FIG. 5, with a rim holder inclined relative to a base structure.
Figure 9:
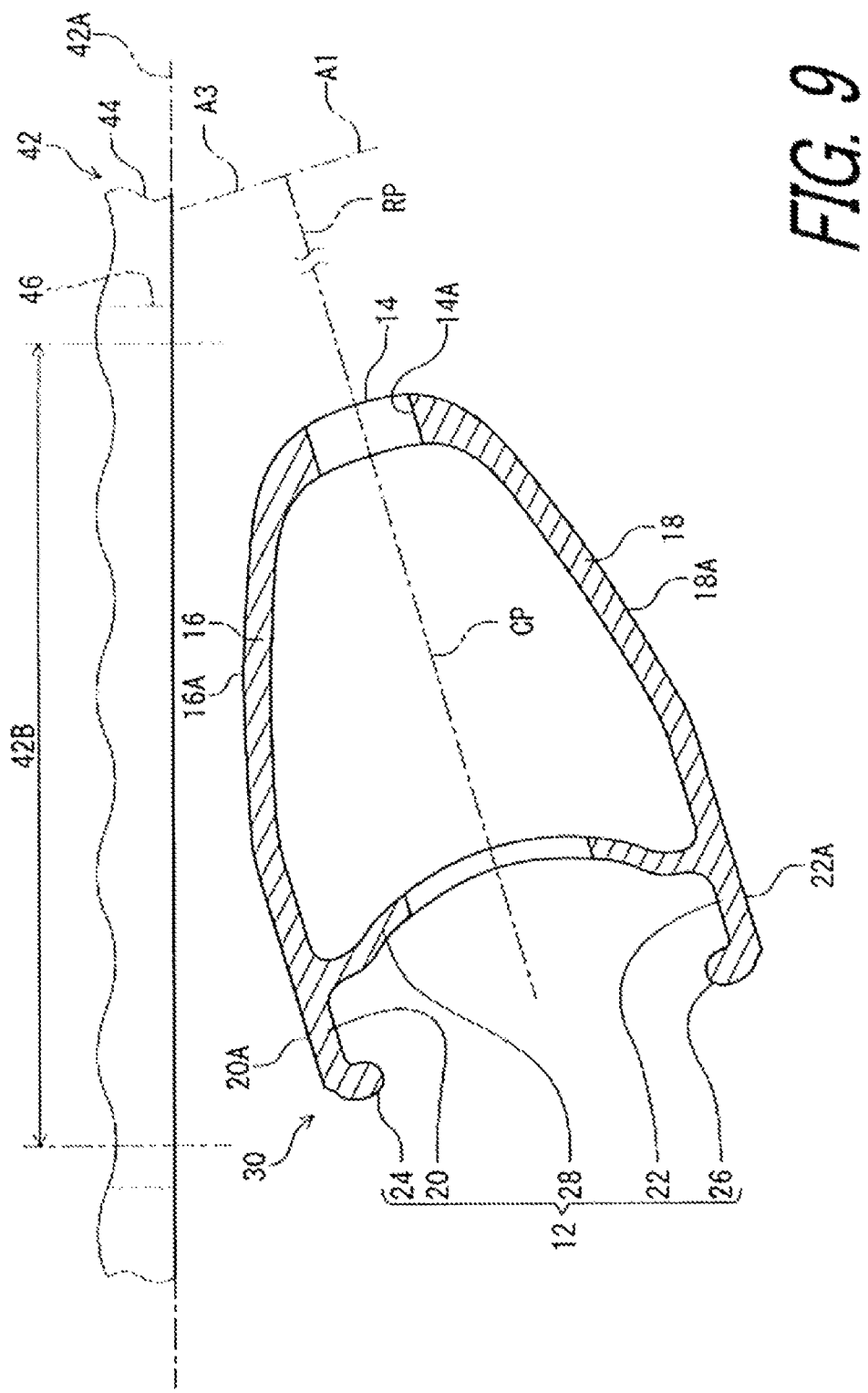
FIG. 9 is a cross-sectional view of the bicycle rim inclined relative to a non-contact printer of the bicycle rim printing apparatus illustrated in FIG. 5.

As seen in FIG. 8, rotation of the handle 90 and the worm 88 rotates the worm wheel 86 about the pivot axis A3, changing a pivotal position of the pivot base 70 relative to the base structure 62. As seen in FIG. 9, this allows a user to change an angle of the first side portion 16 or the second side portion 18 of the annular rim body 30 relative to the non-contact printer 42. The non-contact printer 42 has a print reference plane 42A. The printer head 46 (e.g., the nozzles) defines the print reference plane 42A in this embodiment. The position adjustment structure 84 allows the user to change a relative angle between the axial center plane CP of the annular rim body 30 and the print reference plane 42A of the non-contact printer 42. The position adjustment structure 84 keeps the pivotal position of the pivot base 70 relative to the base structure 62 at an adjusted position with the worm wheel 86 and worm 88. The position adjustment structure 84 can include an electric actuator such as a motor.

As seen in FIG. 9, the non-contact printer 42 has a print area 42B having a width larger than a radial width of each of the first side portion 16 and the second side portion 18. Thus, the printer head 46 is stationary relative to the printer housing 44 in this embodiment. However, at least one of the printer head 46 and the rim holder 52 can be moved relative to the base structure 62 in a radial direction (e.g., a direction D4 illustrated in FIG. 5) with respect to the rotational axis A2 in a case where the width of the print area 42B is smaller than the radial width of each of the first side portion 16 and the second side portion 18.

As seen in FIG. 6, the bicycle rim printing apparatus 40 further comprises a controller 92 electrically connected to the non-contact printer 42 and the rotational actuator 60. In this embodiment, the controller 92 is electrically connected to the ink supplier of the non-contact printer 42 to deposit ink on a target object based on a target image. The controller 92 is electrically connected to the rotational actuator 60 to rotate the rim holder 52 about the rotational axis A2 relative to the base structure 62.

The controller 92 includes a processor 92A, a memory 92B, and a communication interface 92C. The processor 92A, the memory 92B, and the communication interface 92C are electrically mounted on a circuit board 92D and electrically connected to each other with a bus 92E. The processor 92A includes a central processing unit (CPU) and a memory controller. The memory 92B is electrically connected to the processor 92A. The memory 92B includes a read only memory (ROM) and a random-access memory (RAM). The ROM includes a non-transitory computer-readable storage medium. The RAM includes a transitory computer-readable storage medium. The memory 92B includes storage areas each having an address in the ROM and the RAM. The processor 92A controls the memory 92B to store data in the storage areas of the memory 92B and reads data from the storage areas of the memory 92B. The memory 92B (e.g., the ROM) stores a program. The program is read into the processor 92A, and thereby functions of the bicycle rim printing apparatus 40 is performed.

The memory 92B stores a target image to be printed on the annular rim body 30. In this embodiment, the memory 92B stores a target image corresponding to each of the first non-contact printed deposit 32 and the second non-contact printed deposit 36. The controller 92 controls the non-contact printer 42 to print the first non-contact printed deposit 32 or the second non-contact printed deposit 36 on the annular rim body 30 based on the target image.

The controller 92 controls the rotational actuator 60 to rotate the rim holder 52 relative to the base structure 62 about the rotational axis A2 in conjunction with a printing operation of the non-contact printer 42. In this embodiment, the controller 92 controls the rotational actuator 60 to continuously rotate the rim holder 52 with a preset rotational speed by 360 degrees. The memory 92B stores the preset rotational speed.

A printing method of printing a non-contact printed deposit (e.g., the first non-contact printed deposit 32) on the annular rim body 30 will be described in detail below referring to FIGS. 5 to 10.

Figure 10:
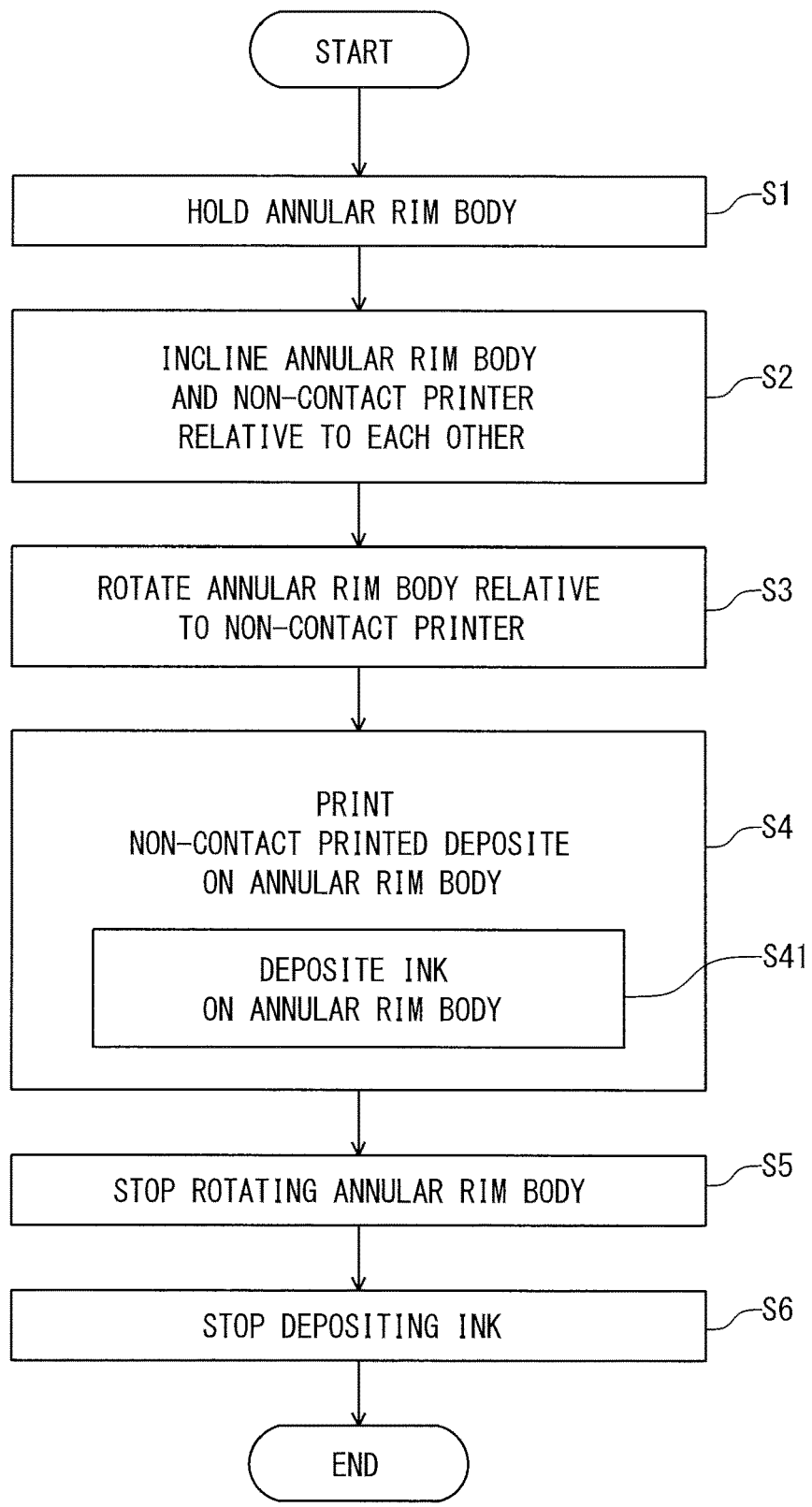
FIG. 10 is a flow chart of a printing method in accordance with the first embodiment.

As seen in FIG. 10, the printing method comprises holding the annular rim body 30 with the rim holder 52 (step S1). As seen in FIGS. 5 to 7, the annular rim body 30 is placed on the holder body 53 of the rim holder 52 and is held with the first to third holders 54 to 58 in the step S1. The annular rim body 30 is held with the rim holder 52 to locate the rotational center axis A1 of the annular rim body 30 in line with the rotational axis A2 of the rotational actuator 60.

As seen in FIG. 10, the printing method further comprises inclining one of the annular rim body 30 and the non-contact printer 42 relative to the other of the annular rim body 30 and the non-contact printer 42 (step S2). In this embodiment, as seen in FIG. 8, the annular rim body 30 is inclined relative to the non-contact printer 42 with the pivot structure 68 and the position adjustment structure 84. As seen in FIG. 9, the axial center plane CP of the annular rim body 30 is inclined relative to the print reference plane 42A of the non-contact printer 42. The position of the non-contact printer 42 can be adjusted relative to the annular rim body 30 with an adjustment structure (not shown) after the inclining of the annular rim body 30.

As seen in FIG. 10, the printing method comprises rotating the annular rim body 30 relative to the non-contact printer 42 about the rotational axis A2 with the rotational actuator 60 (step S3). In this embodiment, the rim holder 52 is continuously rotated relative to the base structure 62 about the rotational axis A2 with the rotational actuator 60 by 360 degrees. Thus, the annular rim body 30 is continuously rotated relative to the non-contact printer 42 about the rotational axis A2 with the rotational actuator 60 by 360 degrees. However, the annular rim body 30 can be intermittently rotated relative to the non-contact printer 42 about the rotational axis A2 with the rotational actuator 60.

As seen in FIG. 10, the printing method comprises printing the non-contact printed deposit to the annular rim body 30 with the non-contact printer 42 during a rotational movement of the annular rim body 30 (step S4). Specifically, the printing of the non-contact printed deposit includes depositing ink on the first side portion 16 of the annular rim body 30 with the non-contact printer 42 during the rotational movement of the annular rim body 30 (step S41). In this embodiment, the non-contact printer 42 deposits ink on the first side portion 16 of the annular rim body 30 based on the target image until the annular rim body 30 is rotated by 360 degrees. The printer head 46 is stationary relative to the printer housing 44 and the base structure 62 in this embodiment.

In this embodiment, since the annular rim body 30 and the non-contact printer 42 are inclined relative to each other in the step S2, the printing of the non-contact printing deposit includes printing the non-contact printed deposit to the annular rim body 30 with the non-contact printer 42 of the annular rim body 30 in a state where the annular rim body 30 and the non-contact printer 42 are inclined relative to each other.

As seen in FIG. 10, the printing method comprises stopping rotating the annular rim body 30 (step S5) and stopping depositing ink from the non-contact printer 42 (step S6).

The second non-contact printed deposit 36 is printed on the second side portion 18 of the annular rim body 30 in the same method as the above method. Thus, it will not be described in detail here for the sake of brevity.

Modifications

Figure 11:
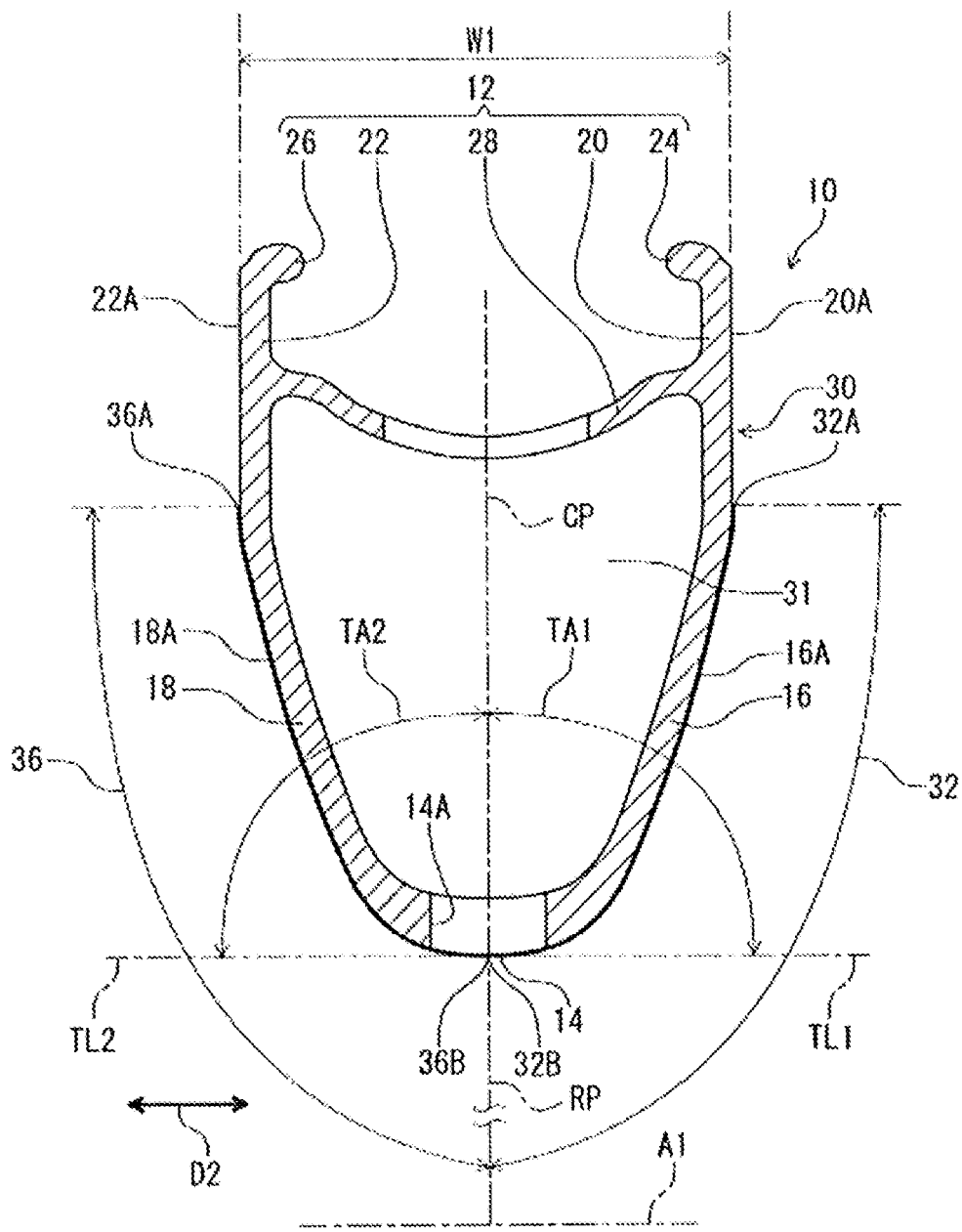
FIG. 11 is a cross-sectional view of a bicycle rim in accordance with a modification.

In the first embodiment, the first non-contact printed deposit 32 is spaced apart from the second non-contact printed deposit 36. Specifically, the first inner periphery 32B of the first non-contact printed deposit 32 is spaced apart from the second inner periphery 36B of the second non-contact printed deposit 36. The first non-contact printed deposit 32 and the second non-contact printed deposit 36 do not reach the axial center plane CP. As seen in FIG. 11, however, at least one of the first non-contact printed deposit 32 and the second non-contact printed deposit 36 can reach the axial center plane CP. In FIG. 11, the first non-contact printed deposit 32 and the second non-contact printed deposit 36 reach the axial center plane CP. The first inner periphery 32B of the first non-contact printed deposit 32 coincides with the second inner periphery 36B of the second non-contact printed deposit 36. In this modification, the first tangential line TL1 and the second tangential line TL2 can be substantially parallel to the rotational center axis A1 of the bicycle rim 10. Namely, the first surface angle TA1 and the second surface angle TA2 can be equal to 90 degrees if the first non-contact printed deposit 32 and the second non-contact printed deposit 36 reach the axial center plane CP.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the temi "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle rim printing apparatus comprising:
   a non-contact printer to print a non-contact printed deposit to an annular rim body;
   a rim holder to hold the annular rim body; and
   a rotational actuator to rotate the rim holder about a rotational axis relative to the non-contact printer, wherein
   the rim holder is configured to pivot about a pivot axis that is non-parallel to the rotational axis.

2. The bicycle rim printing apparatus according to claim 1, further comprising
   a base structure, wherein
   the non-contact printer is attached to the base structure to print the non-contact printed deposit to the annular rim body.

3. The bicycle rim printing apparatus according to claim 2, further comprising
   a pivot structure pivotally coupling the rotational actuator to the base structure about the pivot axis.

4. The bicycle rim printing apparatus according to claim 2, wherein
   the non-contact printer is positionally secured to the base structure.

5. The bicycle rim printing apparatus according to claim 1, wherein
   the pivot axis is perpendicular to the rotational axis when viewed from a direction perpendicular to both the pivot axis and the rotational axis.

6. The bicycle rim printing apparatus according to claim 1, further comprising:
   a pivot structure to incline the annular rim body relative to the non-contact printer,
   wherein the non-contact printer prints the non-contact printed deposit to the annular rim body in a state where the annular rim body and the non-contact printer are inclined relative to each other and the annular rim body is rotated by the rotational actuator.

7. A printing method of printing a non-contact printed deposit on an annular rim body, the printing method comprising:
   rotating the annular rim body about a rotational axis relative to a non-contact printer with a rotational actuator;
   inclining the annular rim body about a pivot axis that is non-parallel to the rotational axis; and
   printing the non-contact printed deposit to the annular rim body with the non-contact printer during a rotational movement of the annular rim body.

8. The printing method according to claim 7, wherein
   the non-contact printed deposit includes lines of ink extending in a circumferential direction with respect to a rotational center axis of the annular rim body.

9. The printing method according to claim 7, wherein the non-contact printed deposit is at least partly provided on a curved surface on a side portion of the annular rim body, a tangential line being defined on the curved surface in which the non-contact printed deposit is provided, a surface angle being defined by the tangential line and a reference plane perpendicular to a rotational center axis of the annular rim body, the surface angle being equal to or larger than 35 degrees.

10. The printing method according to claim 9, wherein
    the tangential line extends radially outwardly from the rotational center axis when viewed in an axial direction with respect to the rotational center axis.

11. The printing method according to claim 7, wherein
    the annular rim body includes:
    a tire-attachment portion,
    an inner peripheral portion provided radially inwardly from the tire-attachment portion with respect to a rotational center axis of the bicycle rim, and
    a side portion extending radially inwardly from the tire-attachment portion to the inner peripheral portion; and
    the non-contact printed deposit extends to the inner peripheral portion.

12. The printing method according to claim 7, wherein
    the annular rim body includes:
    a tire-attachment portion,
    an inner peripheral portion provided radially inwardly from the tire-attachment portion with respect to a rotational center axis of the bicycle rim, and
    a side portion extending radially inwardly from the tire-attachment portion to the inner peripheral portion; and
    the non-contact printed deposit extends to an axial center plane defined to bisect an axial maximum width of the annular rim body in an axial direction with respect to the rotational center axis.

13. The printing method according to claim 7, wherein
    the annular rim body includes:
    a tire-attachment portion,
    an inner peripheral portion provided radially inwardly from the tire-attachment portion with respect to the rotational center axis of the bicycle rim, and
    the side portion extending radially inwardly from the tire-attachment portion to the inner peripheral portion; and
    the non-contact printed deposit has a pixel count equal to or larger than 200 dpi.

14. A bicycle rim printing apparatus comprising:
    a non-contact printer to print a non-contact printed deposit to an annular rim body;
    a rim holder to hold the annular rim body;
    a rotational actuator to rotate the rim holder relative to the non-contact printer about a rotational axis; and
    a controller electrically connected to the non-contact printer and to the rotational actuator, wherein
    the controller is configured to control the rotational actuator to rotate the rim holder about the rotational axis in conjunction with the controller controlling the non-contact printer to perform a printing operation in which a non-contact printed deposit is provided on the annular rim body, the non-contact printed deposit is at least partly provided on a curved surface on a side portion of the annular rim body, a tangential line being defined on the curved surface in which the non-contact printed deposit is provided, a surface angle being defined by the tangential line and a reference plane perpendicular to a rotational center axis of the annular rim body, the surface angle being equal to or larger than 35 degrees.

15. The bicycle rim printing apparatus according to claim 14, wherein
the non-contact printed deposit includes lines of ink extending in a circumferential direction with respect to the rotational center axis.

16. The bicycle rim printing apparatus according to claim 14, wherein
the annular rim body includes:
a tire-attachment portion,
an inner peripheral portion provided radially inwardly from the tire-attachment portion with respect to the rotational center axis of the bicycle rim, and
the side portion extending radially inwardly from the tire-attachment portion to the inner peripheral portion; and
the non-contact printed deposit extends to the inner peripheral portion.

17. The bicycle rim printing apparatus according to claim 14, wherein
the annular rim body includes:
a tire-attachment portion,
an inner peripheral portion provided radially inwardly from the tire-attachment portion with respect to the rotational center axis of the bicycle rim, and
the side portion extending radially inwardly from the tire-attachment portion to the inner peripheral portion; and
the non-contact printed deposit extends to an axial center plane defined to bisect an axial maximum width of the annular rim body in an axial direction with respect to the rotational center axis.

18. The bicycle rim printing apparatus according to claim 14, wherein
the annular rim body includes:
a tire-attachment portion,
an inner peripheral portion provided radially inwardly from the tire-attachment portion with respect to the rotational center axis of the bicycle rim, and
the side portion extending radially inwardly from the tire-attachment portion to the inner peripheral portion; and
the non-contact printed deposit has a pixel count equal to or larger than 200 dpi.

19. The bicycle rim printing apparatus according to claim 18, wherein
the pixel count is equal to or smaller than 2000 dpi.

20. The bicycle rim printing apparatus according to claim 14, wherein
the tangential line extends radially outwardly from the rotational center axis when viewed in an axial direction with respect to the rotational center axis.

* * * * *